United States Patent
O'Rourke

(10) Patent No.: US 6,421,097 B1
(45) Date of Patent: Jul. 16, 2002

(54) METHOD AND APPARATUS FOR REDUCING FLICKER IN A VIDEO IMAGE SEQUENCE

(75) Inventor: Thomas P. O'Rourke, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/126,760

(22) Filed: Jul. 31, 1998

(51) Int. Cl.[7] .......................... H04N 5/21; H04N 5/213; H04N 5/217; H04N 9/73; H04N 9/64; G06R 9/46; G06R 9/40

(52) U.S. Cl. .................... 348/607; 348/608; 348/612; 348/624; 348/226; 348/241; 348/242; 382/250; 382/261; 382/236; 382/54

(58) Field of Search ................... 348/607, 614, 348/447, 910, 608, 612, 624, 226, 241, 242; 382/250, 261, 54, 236

(56) References Cited

U.S. PATENT DOCUMENTS

| | | | |
|---|---|---|---|
| 3,571,497 A | * 3/1971 | Butterfield | 178/5.4 |
| 4,888,795 A | 12/1989 | Ando et al. | |
| 4,947,251 A | * 8/1990 | Hentschel | 358/166 |
| 4,963,965 A | 10/1990 | Haghiri et al. | |
| 5,136,385 A | * 8/1992 | Campbell | 358/160 |
| 5,146,329 A | 9/1992 | Flamm | |
| 5,214,501 A | * 5/1993 | Cavallerano et al. | 358/12 |
| 5,272,539 A | 12/1993 | Kondo | |
| 5,473,686 A | * 12/1995 | Virdee | 379/410 |
| 5,631,706 A | 5/1997 | Tsunashima | |
| 5,748,792 A | 5/1998 | Wober | |
| 5,796,445 A | 8/1998 | Nomura et al. | |
| 5,892,551 A | 4/1999 | Uematsu | |
| 5,909,516 A | 6/1999 | Lubin | |
| 5,926,209 A | * 7/1999 | Glatt | 348/143 |
| 6,128,539 A | * 10/2000 | Markandey et al. | 700/29 |
| 6,130,723 A | * 10/2000 | Medin | 348/607 |
| 6,148,103 A | * 11/2000 | Nenonen | 382/169 |

OTHER PUBLICATIONS

Hentschel, et al., Comparison between median filtering and vertical edge controlled interpolation of flicker reduction, Jun. 1989 IEEE, pp. 279–289.*

* cited by examiner

Primary Examiner—John W. Miller
Assistant Examiner—Paulos Natnael
(74) Attorney, Agent, or Firm—John Kacvinsky

(57) ABSTRACT

Briefly, in accordance with one embodiment of the invention, a method of reducing flicker in a video image sequence includes the following. Successive video images are temporally filtered. The filter length is adjusted so as to reduce the amount of filtering across temporal discontinuities in the video image sequence.

Briefly, in accordance with another embodiment of the invention, a method of reducing flicker in a video image sequence includes the following. Successive video images are temporally filtered. The filter length is dynamically adjusted.

21 Claims, 3 Drawing Sheets though the invention is not limited in scope in this respect. As FIG. 2 illustrates, an idealized band stop filter rejects incoming signals having a frequency between designated rejection frequencies, f1 and f2, where fo is the frequency being suppressed. It is noted that an ideal band stop filter is not physically realizable; however, it may be approximated.

METHOD AND APPARATUS FOR REDUCING FLICKER IN A VIDEO IMAGE SEQUENCE

BACKGROUND

1. Field

The present invention relates to video image processing, and more particularly, to reducing flicker in a video image sequence.

2. Background Information

FIG. 1 is a schematic diagram illustrating an arrangement for a typical video conferencing system. In this diagram, a user/subject is positioned in front of a camera 110 while looking at a computer monitor 120. The area or room is illuminated by a light source 130. Camera 110 is designed to reduce flicker due to light source 130. This may be accomplished by setting the aperture time of the camera to capture a whole number of illumination cycles for light source 130. In this context, aperture time refers to the length of time during which the camera is sensitive to incident light. Illumination cycle refers to the multiplicative inverse of the frequency of the variation of the intensity of the light source. This may also be accomplished by setting the camera frame rate such that the frame exposure starts at approximately the same point in the illumination cycle for each frame.

For the situation illustrated in FIG. 1, computer monitor 120 acts as a second light source. The refresh rate on the computer monitor depends on many variables and, quite possibly, does not correspond to one of the frequencies handled by the camera using the previously described methods. Due to this frequency mismatch, some frames, such as in an image sequence displaying the scene illustrated in FIG. 1, may get more illumination than other frames, resulting in flickering in the video sequence that may be annoying to a human observer. A need, therefore, exists for a technique to reduce flicker for video image sequences displaying situations or scenes involving a second light source, such as a computer monitor, for example.

SUMMARY

Briefly, in accordance with one embodiment of the invention, a method of reducing flicker in a video image sequence includes the following. Successive video images are temporally filtered. The filter length is adjusted so as to reduce the amount of filtering across temporal discontinuities in the video image sequence.

Briefly, in accordance with another embodiment of the invention, a method of reducing flicker in a video image sequence includes the following. Successive video images are temporally filtered. The filter length is dynamically adjusted.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in details so as not to obscure the present invention.

Figure 1:
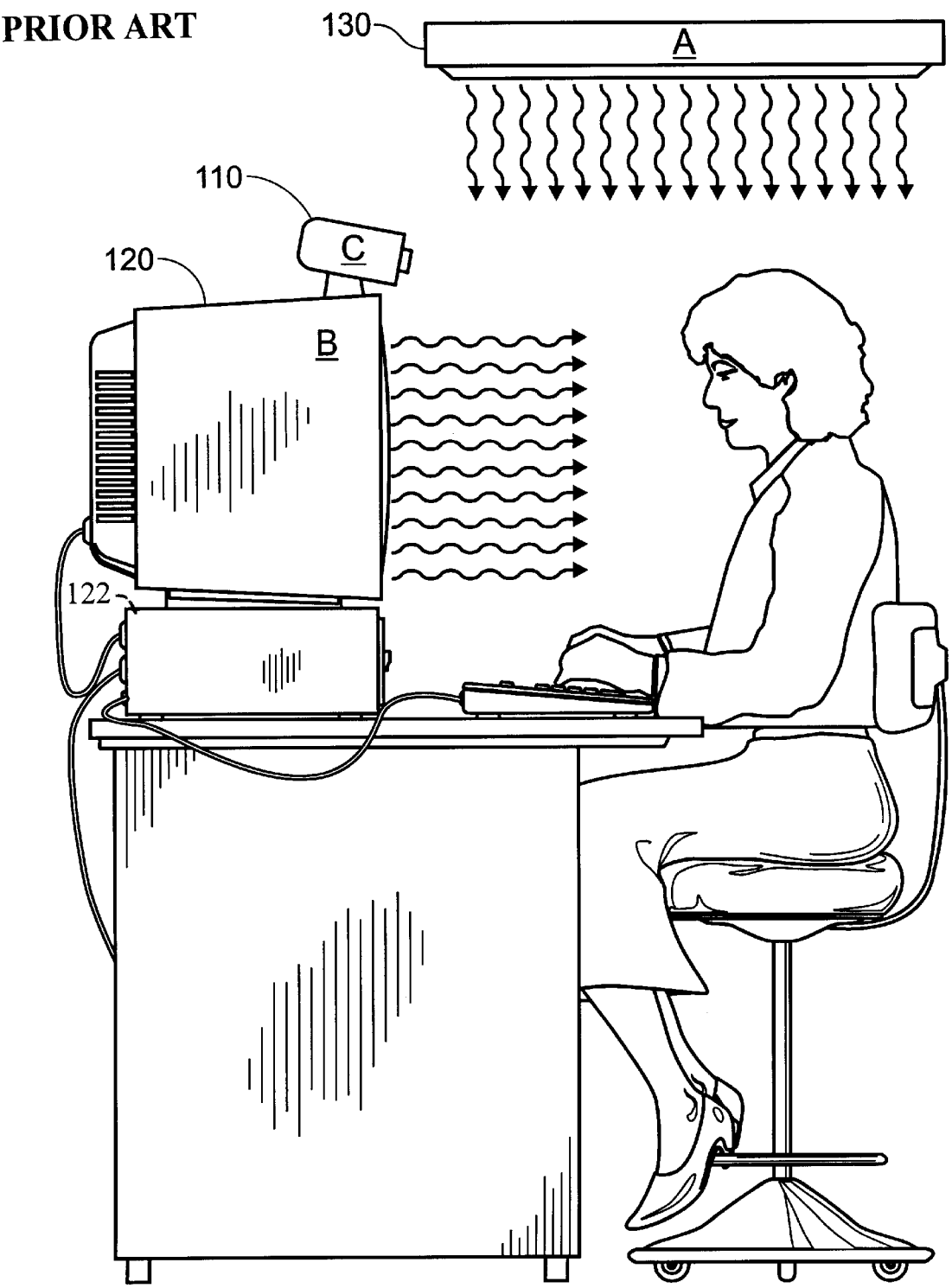
FIG. 1 is a schematic diagram illustrating a typical video conferencing system.

As previously indicated, FIG. 1 is a schematic diagram illustrating a typical video conferencing system set-up, although the invention is not limited in scope to being employed in connection with video conferencing. As illustrated in FIG. 1, a user/subject is positioned in front of a camera 110 while looking at a monitor 120, such as a computer monitor. The room or area is illuminated by a light source 130. The camera 110 is designed to reduce flicker attributable to the light source 130 in a video image sequence displaying the scene. This may be accomplished by a variety of techniques, as previously described. However, computer monitor 120 acts as a second light source. The refresh rate on the computer monitor may depend on many variables and, quite possibly, does not correspond to one of the frequencies handled by the camera using the previously described methods. Due to this frequency mismatch, some frames in the video image sequence may receive more illumination than other frames, resulting in flickering in the video image sequence that may be annoying to a human watching the video image sequence.

One embodiment of a method of reducing flicker in a video image sequence in accordance with the present invention includes the following. A succession or sequence of video images are temporally filtered, and the filter length is adjusted, as described in more detail hereinafter. To accomplish this temporal filtering, it may, in some instances, be desirable to determine the flicker frequency to be suppressed. This may be accomplished any one of a number of ways or, alternatively, instead of determining the flicker frequency, a user provided adjustment may be made until the amount of flicker is acceptable to the end user. However, if it is desirable to determine the flicker frequency, this may be determined, for example, from the monitor refresh rate and camera parameters, such as aperture time and frame rate, in some embodiments. This information could be provided by the operating system and/or by the hardware in one example embodiment. Alternatively, the flicker frequency may be determined from a frequency analysis applied to a sequence of sample frames produced by the camera. Techniques to do this are well-known and will not be discussed further here. In yet another alternative, a user interface control may be employed to obtain the flicker frequency from the user or, as previously indicated, without specifically providing a flicker frequency value, the user may modify the filtering capability of the filter and observe the effect on the displayed video image sequence and, through that technique, ultimately arrive at an acceptable amount of flicker.

Figure 2:
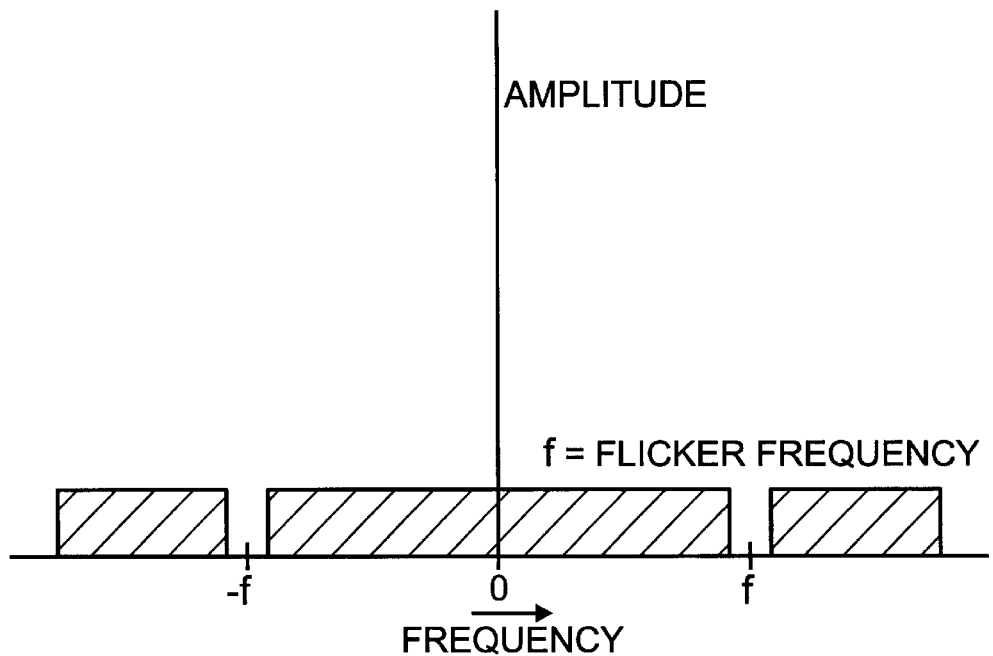
FIG. 2 is a schematic diagram illustrating an ideal band stop filter.
Figure 4:
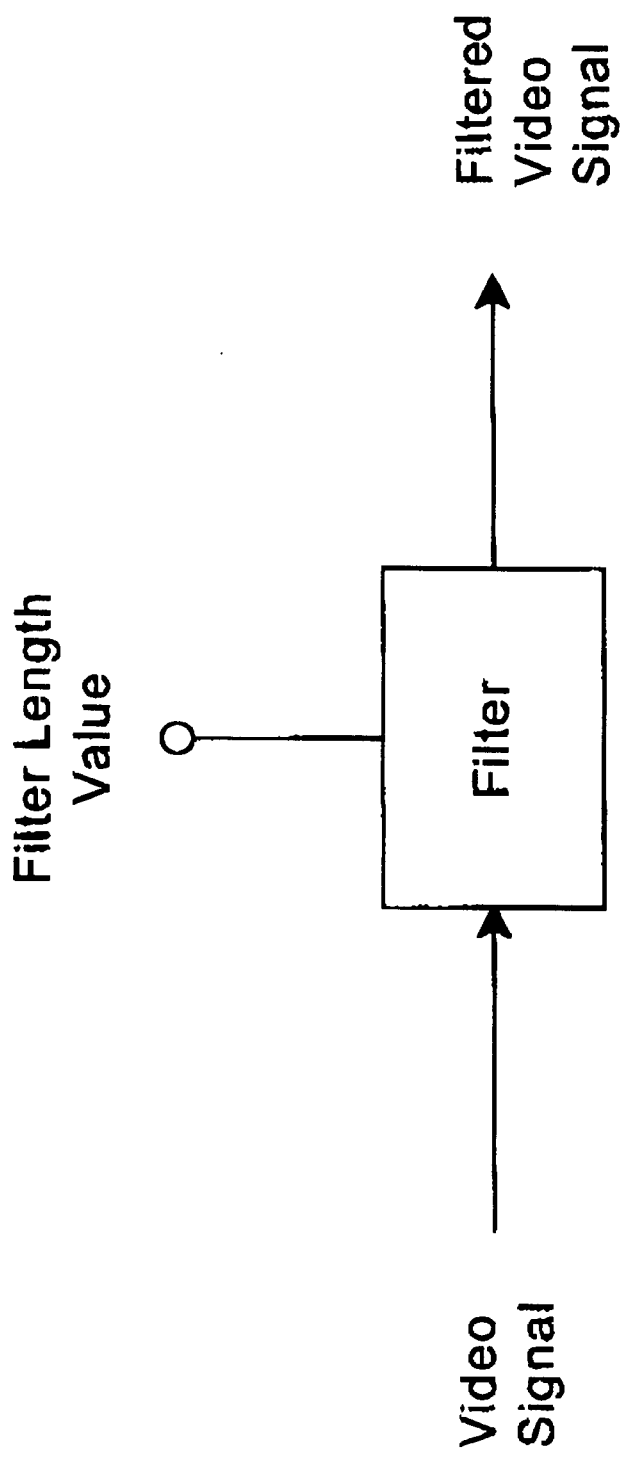
FIG. 4 is a block diagram of a filter in accordance with one embodiment of the invention.

In this particular embodiment, although the invention is not limited in scope in this respect, flicker is reduced by implementing a zero-delay band stop filter. FIG. 2 and 4 illustrate a schematic diagram of an idealized band stop filter designed to suppress the flicker frequency. Common techniques are available to generate, for example, a 2N+1 tap, linear phase, finite impulse response (FIR) filter with a stop band at the flicker frequency, where N is a positive integer. The FIR filter may be modified to reduce or eliminate delay by doubling the filter coefficients from previous samples and setting to zero the filter coefficients for future samples. The filter coefficient for the current sample is not changed. The result is an N+1 tap FIR filter with a stop band at the flicker frequency and substantially zero delay. Again, this will not be described in great detail here because techniques for filter design are well-known. Any one of a number of approaches may be employed to produce such a filter and software packages are commercially available to accomplish this. For example, "MatLab" (version 5.2) available from The Math Works, Inc. of Natick, Mass. may be employed, although, clearly, the invention is not limited to employing this commercially available product. It is also noted that it may be desirable to recalibrate the filters if the monitor refresh rate is changed or if the camera parameters, such as frame rate, are modified.

Figure 3:
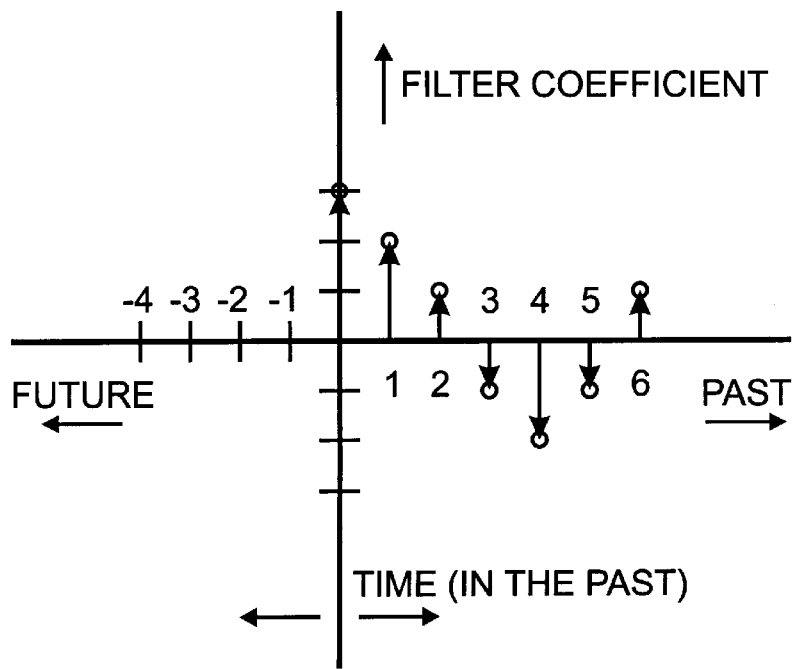
FIG. 3 is a plot illustrating a temporal filter that may be employed by an embodiment in accordance with the present invention.

In one embodiment, the filter length may be adjusted to trade off the amount of observable image flicker and image ghosting, although the invention is not limited in scope in this respect. For example, where an N+1 tap FIR filter is employed, it may be applied to the current video frame and previous video frames on a pixel-by-pixel basis in the temporal direction to produce the current output frame, such as illustrated in FIG. 3, in one embodiment, for example. However, a non-adaptive application of this filter, while suppressing flicker, may also introduce a ringing artifact that appears visually as "ghosting". The ringing or ghosting may be attributable, at least in part, to object motion which may produce a discontinuity in the temporal direction at a particular pixel location. Therefore, in this particular embodiment, to suppress the flicker without excessive ghosting, a buffer may be employed to store a filter length value for each pixel location. In one embodiment, the filter lengths are initially set to one. Likewise, if the absolute difference between the current frame pixel value and the previous frame pixel value is less than a predetermined threshold, the filter length for that pixel may be incremented. Otherwise, the filter length for that pixel is reset to one, for this embodiment. Thus, the filter length is adjusted to reduce the amount of filtering across temporal discontinuities in the video image sequence. The threshold value provides in this embodiment effectively a trade-off between flicker reduction and ghosting reduction, although the invention is not limited in scope in this respect, and may be adjusted. For example, as previously indicated, this may be a parameter that the end user may adjust in real time to observe the effects on a display or monitor. In another embodiment, it may be presumed that the flicker effect will change a particular pixel value by no more than plus or minus 15%, for example. Applying this value to a pixel value in the range of zero to 255 results in a threshold in the neighborhood of 38. Alternatively, some embodiments may employ the use of a threshold value which is a power of 2. This might, for example, result in a threshold of 32.

In this particular embodiment, the adaptive filter has a length n on a per pixel basis from one to N+1, where n is a positive integer. In one embodiment, a set of filters with lengths from one to N+1 may be generated with the appropriate filter being selected for a particular pixel based on the filter length value described above. All the filters may be designed for substantially the same stop band, but the longer filters, of course, should provide improved flicker suppression. Alternatively, in another variation, one N+1 tap filter may be generated and, for a filter of length n, the first n coefficients of the N+1 tap filter may be employed. The output signal of the shortened filter may then be appropriately scaled. Many other filter embodiments, of course, are also possible.

An embodiment of a computing platform, such as a personal computer, for example, may be adapted to implement an embodiment of a method for reducing flicker in a video image sequence in accordance with the invention, such as one of the embodiments previously described. Such a computing platform may be adapted to process video images. For example, a PC may include loaded software that when executed performs this result. The platform may be further adapted to temporally filter a video image sequence and to adjust the length of the temporal filter, such as dynamically. Likewise, in another embodiment, an article of manufacture may comprise a storage medium, such a disk, floppy, CD-ROM, or hard drive, for example, including instructions stored thereon that, when executed by a processor, result in the execution of an embodiment of a method for reducing flicker in a video image sequence in accordance with the invention, such as one of the previously described embodiments.

While certain features of the invention have been illustrated as described herein, many modifications, substitutions, changes and equivalents will now occur to those skilled in the art. It is, therefore, to be understood that the appended claims are intended to cover all such modifications and changes as fall within the true spirit of the invention.

What is claimed is:

1. A method of reducing flicker in a video image sequence comprising:
   temporally filtering the successive video images; and
   dynamically adjusting the filter length, wherein adjusting the filter length comprises increasing the filter length if the absolute different between the current image pixel and the previous image pixel is less than a predetermined threshold and setting the filter length to one otherwise.

2. The method of claim 1, wherein the adjustment is performed on a pixel-by-pixel basis.

3. The method of claim 1, wherein the adjustment is performed on a groupings of contiguous pixels basis.

4. The method of reducing flicker in a video image sequence comprising:
   temporally filtering the successive video images to suppress a flicker frequency;
   adjusting the filter length so as to reduce the amount of filtering across temporal discontinuities in the video image sequence; and
   wherein the temporal filtering is performed on a pixel-by-pixel basis.

5. A method of reducing flicker in a video image sequence comprising:
   temporally filtering the successive video images; and
   adjusting the filter length so as to reduce the amount of filtering across temporal discontinuities in the video image sequence, wherein adjusting the filter length comprises increasing the filter length if the absolute difference between the current image pixel and the previous image pixel is less than a predetermined threshold and setting the filter length to one otherwise.

6. An article comprising:
   a storage medium;

said storage medium including stored thereon instructions that, when executed by a processor, result in temporally filtering the successive video images and in adjusting the filter length so as to reduce the amount of filtering across temporal discontinuities in the video image sequence, and adjusting the filter length by increasing the filter length if the absolute difference between the current image pixel and the previous image pixel is less than a predetermined threshold and setting the filter length to one otherwise.

7. An article comprising:

a storage medium;

said storage medium including stored therein instructions that, when executed by a processor, result in temporally filtering the successive video images and in dynamically adjusting the filter length by increasing the filter length if the absolute difference between the current image pixel and the previous image pixel is less than a predetermined threshold and setting the fir length to one otherwise.

8. A system comprising:

a computing platform adapted to process video images;

said platform being further adapted to temporally filter a video image sequence;

said platform being adapted to dynamically adjust the filter length by increasing the filter length if the absolute difference between the current image pixel and the previous image pixel is less than a predetermined threshold and setting the filter length to one otherwise.

9. A method of reducing flicker in a video image sequence comprising:

temporally filtering the successive video images to suppress a flicker frequency;

dynamically adjusting the filter length; and wherein adjusting the filter length comprises increasing the filter length if the absolute difference between the current image pixel and the previous image pixel is less than a predetermined threshold and setting the filter length to one otherwise.

10. The method of claim 9, wherein the adjustment is performed on a pixel-by-pixel basis.

11. The method of claim 9, wherein the adjustment is performed on a grouping of contiguous pixel basis.

12. A method of reducing flicker in a video image sequence comprising:

temporally filtering the successive video images to suppress a flicker frequency;

adjusting the filter length so as to reduce the amount of filtering across temporal discontinuities in the video image sequence; and wherein adjusting the filter length comprises increasing the filter length if the absolute difference between the current image pixel and the previous image pixel is less than a predetermined threshold and setting the filter length to one otherwise.

13. The method of claim 9, wherein the temporal filter comprises a bandstop filter.

14. The method of claim 9, wherein the adjustment is performed on a pixel-by-pixel basis.

15. The method of claim 9, wherein the adjustment is performed on a grouping of contiguous pixels basis.

16. An article comprising:

a storage medium;

said storage medium including stored thereon instructions that, when executed by a processor, result in temporally filtering the successive video images to suppress a flicker frequency and in adjusting the filter length so as to reduce the amount of filtering across temporal discontinuities in the video image sequence, and include the capability to dynamically adjust the filter length to trade-off the observable image flicker and image ghosting.

17. The article of claim 16, wherein the stored instructions, when executed by a processor, further result in adjusting the filter length by increasing the filter length if the absolute difference between the current image pixel and the previous image pixel is less than a predetermined threshold and setting the filter length to one otherwise.

18. An article comprising:

a storage medium;

said storage medium including stored therein instructions that, when executed by a processor, result in temporally filtering the successive video images to suppress a flicker frequency and in dynamically adjusting the filter length, and include the capability to dynamically adjust the filter length to trade-off the observable image flicker and image ghosting.

19. The article of claim 18, wherein the stored instructions, when executed by a processor, further result in adjusting the filter length by increasing the filter length if the absolute difference between the current image pixel and the previous image pixel is less than a predetermined threshold and setting the fir length to one otherwise.

20. A system comprising:

a computing platform adapted to process video images;

said platform being further adapted to temporally filter a video image sequence to suppress a flicker frequency;

said platform being adapted to dynamically adjust the length of the temporal filter; and wherein said platform is further adapted to dynamically adjust the filter length to trade-of the observable image flicker and image ghosting.

21. The system of claim 20, wherein said platform is further adapted to adjust the filter length by increasing the filter length if the absolute difference between the current image pixel and the previous image pixel is less than a predetermined threshold and setting the filter length to one otherwise.

* * * * *